(12) United States Patent
Moroi et al.

(10) Patent No.: US 6,558,112 B2
(45) Date of Patent: May 6, 2003

(54) FLUID HEATING DEVICES

(75) Inventors: Takahiro Moroi, Kariya (JP); Masami Niwa, Kariya (JP); Shigeru Suzuki, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/904,637

(22) Filed: Jul. 13, 2001

(65) Prior Publication Data
US 2002/0008151 A1 Jan. 24, 2002

(30) Foreign Application Priority Data
Jul. 17, 2000 (JP) ........................................ 2000-216412

(51) Int. Cl.[7] ................................................ F04D 5/00
(52) U.S. Cl. ........................................ 415/1; 415/55.1
(58) Field of Search ................ 415/55.1, 55.2, 55.3, 55.4, 1; 416/234, 223 B; 237/1 R; 126/247

(56) References Cited

U.S. PATENT DOCUMENTS

| | | | |
|---|---|---|---|
| 1,973,669 A | 9/1934 | Spoor | 415/55.1 |
| 1,976,896 A | 10/1934 | Siemen et al. | 415/55.1 |
| 3,720,372 A | 3/1973 | Jacobs | 237/12.3 B |
| 4,231,727 A | 11/1980 | Buchholz et al. | 418/76 |
| 4,370,956 A | 2/1983 | Moser et al. | 123/196 AB |
| 4,483,656 A * | 11/1984 | Abe et al. | 415/55.1 |
| 4,493,293 A | 1/1985 | Paul et al. | 123/41.12 |
| 4,744,336 A | 5/1988 | Miller | 123/41.1 |
| 5,188,522 A | 2/1993 | Hara | 418/77 |
| 5,516,259 A * | 5/1996 | Niederkofler et al. | 415/55.1 |
| 5,579,728 A | 12/1996 | Gotmalm | 123/41.55 |
| 5,642,991 A | 7/1997 | Singleterry et al. | 418/104 |
| 5,683,031 A * | 11/1997 | Sanger | 237/1 R |
| 5,697,767 A | 12/1997 | Bissel et al. | 417/350 |
| 6,174,128 B1 * | 1/2001 | Yu | 415/55.2 |

FOREIGN PATENT DOCUMENTS

DE  31 47 468 A1  12/1982  ............ B60H/1/00

* cited by examiner

Primary Examiner—Ninh Nguyen
(74) Attorney, Agent, or Firm—Morgan & Finnegan, LLP

(57) ABSTRACT

Fluid heating devices may be utilized, for example, to heat a vehicle coolant and may include a rotor body rotatably supported within a rotor housing. A plurality of blades may be disposed on a circumferential surface of the rotor body and a channel may be defined between each two adjacent blades. Each channel has a base portion, an inner circumferential end and an outer circumferential end. Preferably, the inner circumferential end is longer than the outer circumferential end as measured from the base portion. Further, the outer circumferential ends of the channels may define wall portions and the wall portions are preferably shorter than the inner circumferential ends as measured from the base portions of the channels. In view of this design, it is not necessary to provide shields toward the outer circumferential ends of the channels.

20 Claims, 7 Drawing Sheets

FLUID HEATING DEVICES

BACKGROUND OF THE INVENTION

1. Technical Field

The present invention relates to fluid heating devices for heating a fluid, such as for example regenerative pumps that can be utilized to circulate and heat a coolant in a vehicle air conditioning/heating system.

2. Description of the Related Art

U.S. Pat. No. 3,720,372 discloses a known fluid heating device that includes a throttle valve disposed downstream of a pump. The fluid pressurized by the pump is introduced to the throttle valve and the throttle valve brakes the fluid in order to heat the fluid. As shown in FIG. 7, the pump 110 of U.S. Pat. No. 3,720,372 has a suction port 113, a discharge port 114, a housing 111, a rotor (impeller) 120, blades (radially extending walls) 121 and channels (grooves) 123. The rotor 120 rotates together with blades 121 within the housing 111. The blades 121 and the channels 123 extend radially from the rotational center or axis 122 of the rotor 120. The housing 111 includes a dividing wall 115 that separates the suction port 113 from the discharge port 114. As shown in FIG. 8, surface 126 of each channel 123 has a curved or semi-circular shape. The outer circumference end 126a and the inner circumference end 126b of the channel surface 126 have equal heights H from the base of the channel 123. Further, the outer circumferential end 126a of the channel 123 forms a wall portion 124 that shields the channel 123. When the rotor 120 rotates, the fluid drawn from the suction port 113 is pressurized and released from the discharge port 114. The throttle valve (not shown) is disposed downstream of the discharge port 114 and the throttle valve brakes the flow of fluid. By throttling or braking the fluid, the internal energy of the fluid is converted to heat and the fluid temperature increases.

SUMMARY OF THE INVENTION

It is an object of the present invention to provide improved fluid heating devices. For example, fluid heating devices of the present teachings may heat the fluid more efficiently than the known fluid heating device. In one embodiment, the fluid heating device may include an improved rotor for pressurizing the fluid. The rotor may include a rotor body, blades and channels. The rotor body may be rotatably supported within a rotor housing. The blades are provided on the circumferential surface of the rotor body. The blade of the rotating rotor pressurizes a fluid drawn into the rotor housing. The pressurized fluid may then be throttled or braked in order to generate heat that will increase the fluid temperature. The channels may be provided on the circumferential surface of the rotor body such that one channel is formed or defined between each two adjacent blades. The height of at least one channel at the inner circumferential end is preferably greater than the height of the channel at the outer circumferential end, which has the effect of increasing the fluid temperature more efficiently.

Other objects, features and advantage of the present invention will be readily understood after reading the following detailed description together with the accompanying drawings and the claims.

DETAILED DESCRIPTION OF THE INVENTION

Figure 1:
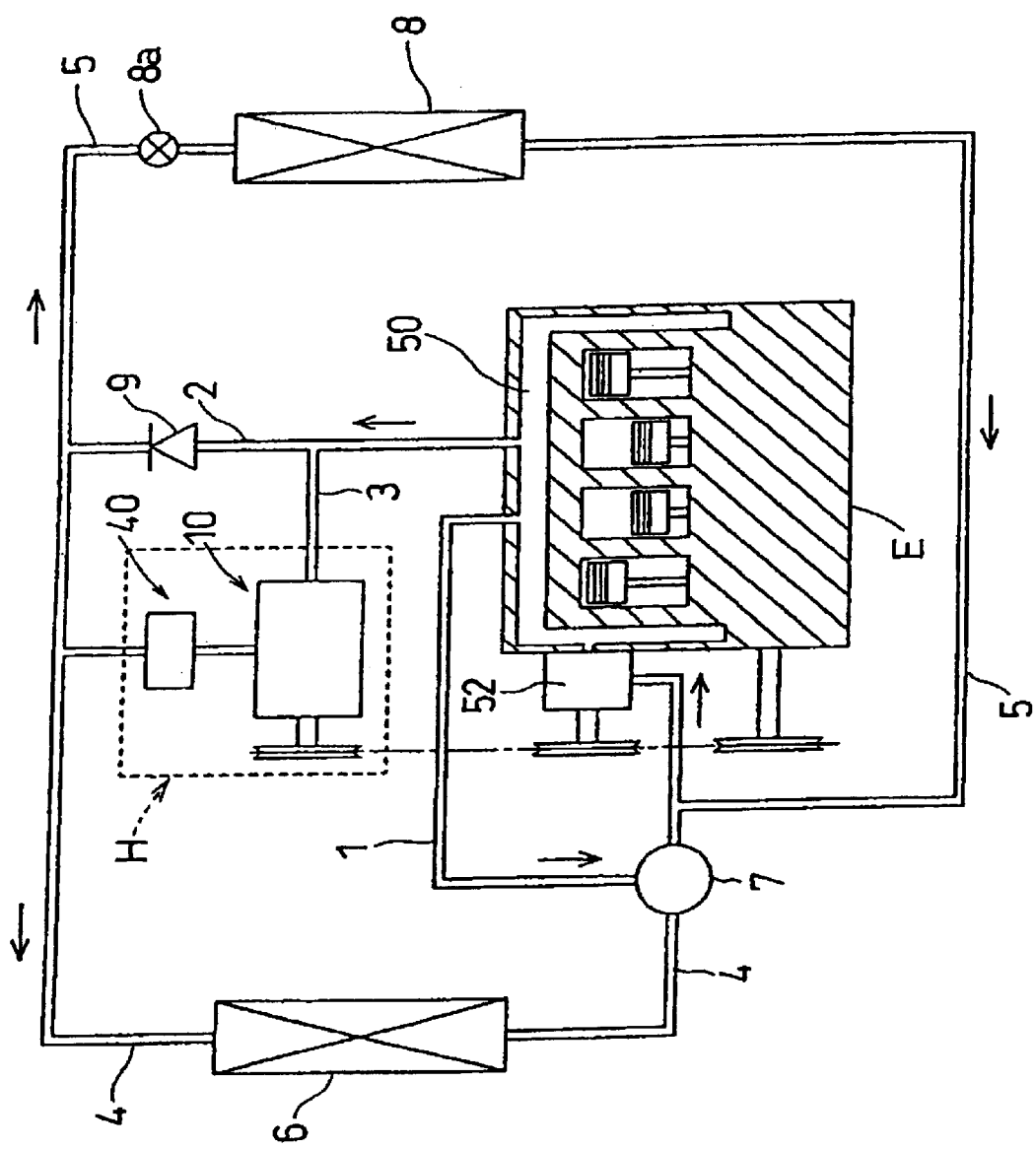
FIG. 1 shows a schematic view of a representative coolant circulation circuit in a vehicle air conditioning system.

Representative fluid heating devices according to the present teachings may include a rotor that has a rotor body, a plurality of blades and a plurality of channels. The rotor body is preferably rotatably supported within a rotor housing. The blades are preferably provided on the circumferential surface of the rotor body. The blades pressurize a fluid drawn into the rotor housing and the pressurized fluid is discharged. The discharged fluid may preferably be throttled or braked in order to generated heat that will increase the fluid temperature. The channels are provided on the circumferential surface of the rotor body such that at least one channel is formed between each two adjacent blades. The channels may preferably generate a secondary flow (eddy flow) of fluid within the rotor housing along the surface of the channels. As a result, the internal energy of the fluid will increase. Further, the channels each have an inner circumferential end and an outer circumferential end. Preferably, the height of the inner circumferential end, as measured from a base portion of the channel, is greater than the height of the outer circumferential end for at least one channel. If the inner circumferential end is longer than the outer circumferential end, the secondary flow (eddy flow) of the fluid generated along the surface of the channel can more effectively increase the internal energy of the fluid than the known fluid heating device. Therefore, the present teachings provide fluid heating devices that are more efficient than the prior art.

According to the present teachings, the interpretation of the term "fluid" is not restricted to a hydraulic fluid, a lubricating oil and/or a coolant. To the contrary, the term fluid is intended to include any type of fluid that is capable of conducting heat.

In a further embodiment of the present teachings, the surface of the inner circumferential end of at least one channel may preferably be lower than the surface of the corresponding outer circumferential end of the channel. This design heats the fluid more efficiently than known designs. Further, the channel may preferably have a curved surface and may be provided on both sides of the rotor body. The blades may preferably extend radially from the rotational center or axis of the rotor body.

Each of the additional features and method steps disclosed above and below may be utilized separately or in conjunction with other features and method steps to provide improved fluid heating devices and methods for designing and using such fluid heating devices. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

For example, the representative fluid heating device that will be described in further detail below may preferably be utilized within a coolant circulation circuit in a vehicle air conditioning system. However, other uses of the present fluid heating devices are clearly contemplated as further discussed above and below.

As shown in FIG. 1, a representative fluid heating device H includes a pump 10 and a throttle valve 40 and is installed in a vehicle air conditioning system. Within the vehicle air conditioning system, a vehicle engine E preferably includes a water pump 52 that supplies a coolant (engine coolant) to a water jacket 50. For example, an anti-freeze solution comprising water and ethylene glycol may preferably be used as the coolant, although naturally other coolants and/or fluids may be utilized as noted above. As shown in FIG. 1, the coolant circulation circuit preferably includes the engine E, a radiator 6, a thermostat valve 7, a heater core 8, a solenoid valve 8a, a check valve 9, a fluid heating device H, and pipes 1 through 5 that connect these components. Pipes 1 to 3 are located on the downstream side of water jacket 50, while pipes 4 and 5 are located on the upstream side of water jacket 50. Pipe 4 includes a suction-side passage that returns to water pump 52 via radiator 6 and thermostat valve 7. Pipe 5 includes a suction-side passage that returns to water pump 52 via the solenoid valve 8a and the heater core 8. Pipe 1 includes the suction-side passage that leads to thermostat valve 7 from the water jacket 50. That is, the thermostat valve 7 is installed at the branching point between pipe 1 and 4. Pipe 2 includes an outflow passage that connects the water jacket 50 to pipes 4 and 5 via check valve 9. Pipes 2 and 3 are disposed in a parallel relationship between water jacket 50 and pipes 4 and 5.

The water pump 52 may be linked to the crankshaft (output shaft) of the engine E via a V-belt. The engine E preferably supplies a driving force to operate the water pump 52. As a result, the water pump 52 supplies the coolant to the water jacket 50.

The radiator 6 functions as a heat exchanger for dissipating heat from the coolant to the outside air. The thermostat valve 7 detects the temperature of the coolant and connects either pipe 1 or 4 to water pump 52 in accordance with the detected temperature. When the temperature detected by thermostat valve 7 is lower than a reference or pre-selected temperature, for example 80° C., the thermostat valve 7 shorts the coolant circulation circuit by connecting pipe 1 to water pump 52, in order to raise the temperature of the coolant using the waste heat of the engine E. To the contrary, when the temperature detected by thermostat valve 7 is higher than the reference or pre-selected temperature, the thermostat valve 7 connects pipe 4 to water pump 52, in order to reduce the coolant temperature. The radiator 6, thermostat valve 7, and pipe 4 may be utilized as components of the cooling circuit within the vehicle air-conditioning system.

The heater core 8 functions as a heat exchanger for heating the vehicle cabin. The solenoid valve 8a is an on/off valve that controls the supply and shut-off of the coolant to heater core 8 from the engine E in accordance with the heating/cooling conditions of the vehicle air-conditioning system. The heater core 8, solenoid valve 8a, and pipe 5 may be utilized as components of the heating circuit within the vehicle air-conditioning system.

The check valve 9 permits coolant to uni-directionally flow from the water jacket 50 to pipe 4 and 5. The check valve 9 opens if the flow rate via pipe 3 is significantly throttled when the flow through the pipe 1 is stopped by thermostat valve 7 (i.e., when the radiator 6 is utilized), thereby maintaining a coolant flow through pipe 4 and/or pipe 5.

Figure 2:
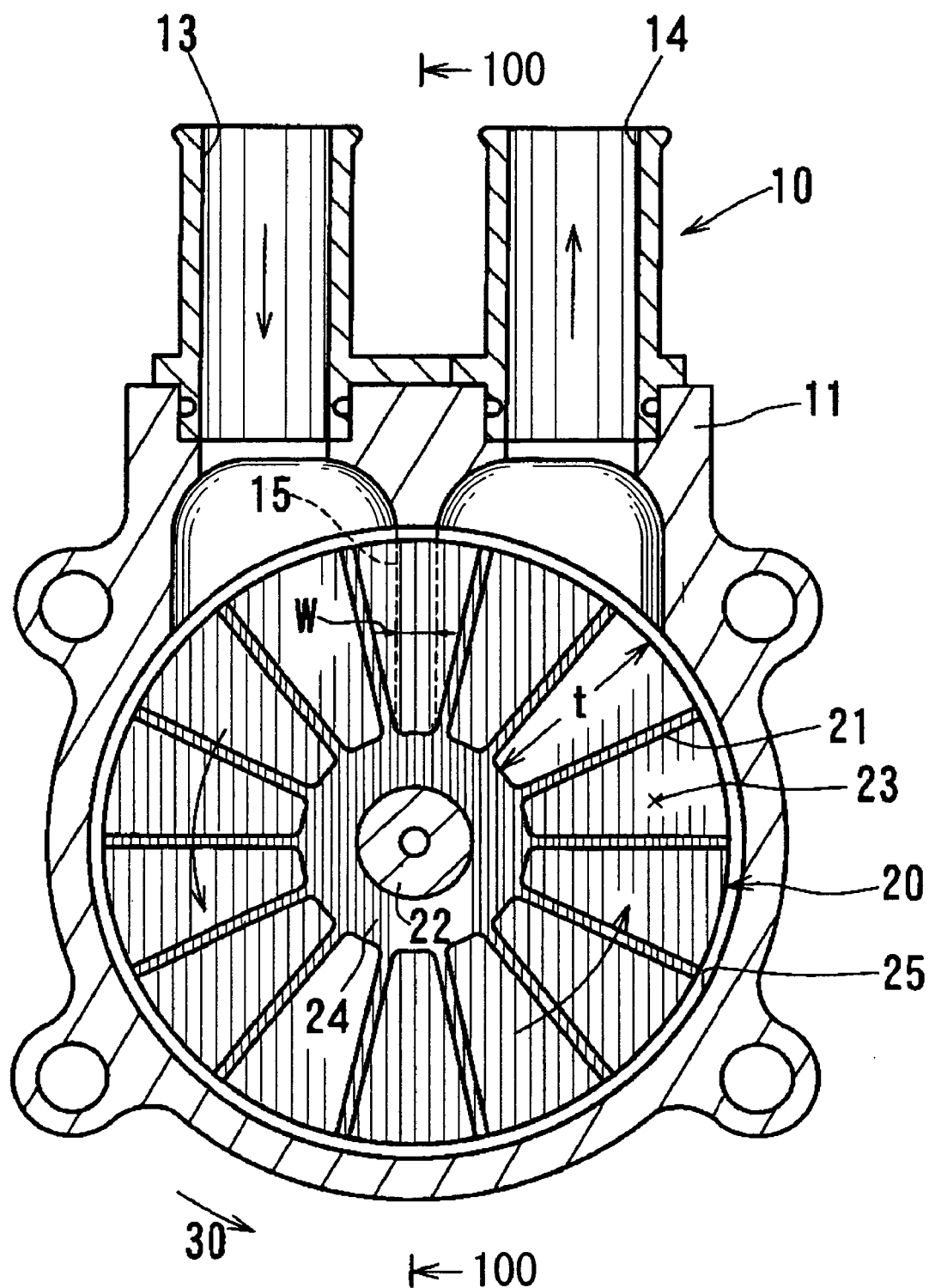
FIG. 2 shows a cross-sectional view of a representative pump that may be utilized in a representative fluid heating device.
Figure 3:
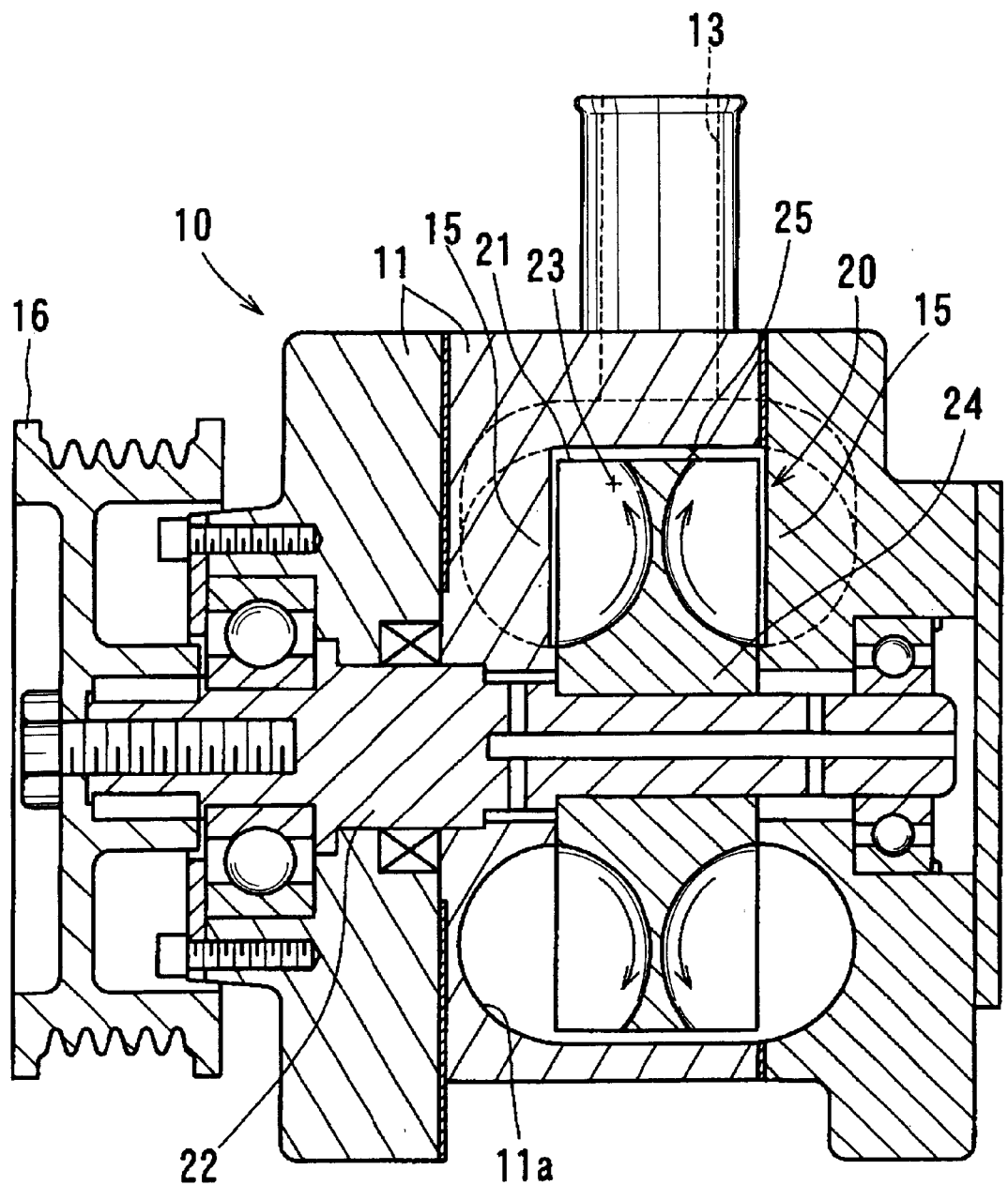
FIG. 3 shows a cross-sectional view taken along line 100—100 in FIG. 2.

As shown in FIG. 1, the turbine-type pump fluid heating device H includes a pump 10 and a throttle valve 40. Due to the cooperation of the pump 10 and the throttle valve 40, the fluid heating device functions as a heating device and a fluid force-feeding (supplying or transporting) device. As shown in FIGS. 2 and 3, the pump 10 includes a rotor 20 that rotates within a pump (rotor) housing 11. The pump housing 11 is defined by joining or attaching front, center and rear housing members. The housing 11 includes a suction port 13 to draw the coolant into an actuation chamber 25. A discharge port 14 is provided to discharge the coolant pressurized by the rotor 20 from the actuation chamber 25. Further, the housing 11 includes a dividing wall 15 that separates the suction port 13 and the discharge port 14. The dividing wall 15 has an approximately uniform thickness W in the radial direction of the rotor 20. The actuation chamber 25 is defined within the pump housing 11 and includes a substantially annular space to receive the rotor 20. The actuation chamber 25 includes grooves 11a. The grooves 11a, which has a semi-circular section, are formed in the pump housing 11. The actuation chamber 25 communicates with the upstream side of pipe 3 via the suction port 13. The actuation chamber 25 also communicates with the downstream portion of the pipe 3 (or the throttle valve 40) via the discharge port 14. A drive shaft 22 is integrally and rotatably coupled to the rotor 20. A pulley 16 is coupled to one end of the drive shaft 22 on the outside of the housing 11. The pulley is operationally coupled to the output shaft (crank shaft) of the engine E by means of a V-belt (not shown).

The rotor 20 includes a rotor body 24 and blades 21. The blades 21 are disposed around the circumference of the rotor body 24 in a uniformly spaced relationship and are disposed on both sides of the rotor body 24. The blades 21 preferably have a flat and square shape and each blade 21 extends radially from the rotational center of rotor body 24. As shown in FIG. 2, each blade 21 preferably has same length "t" with respect to the radial direction of the rotor body 24. Further, the rotor body 24 preferably includes concave-shaped channels 23 on both sides of the rotor body 24. Each blade 21 extends from one side of the rotor body 24 to the opposite side of the rotor body 24.

Figure 4:
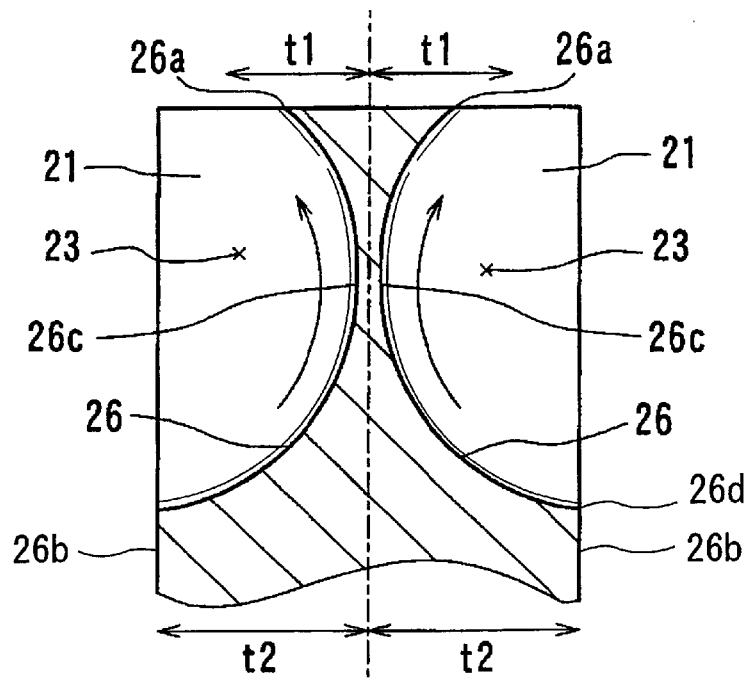
FIG. 4 shows a partial cross-sectional view of a representative rotor in FIG. 3.

As shown in FIG. 4, each channel 23 includes a curved surface 26 extending between an outer circumferential end 26a and an inner circumferential end 26b. The curved surface 26 may be, for example, substantially semi-circular in cross section. The height (length) of the outer circumferential end 26a (indicated as "t1" in FIG. 4) is preferably less than the height (length) of the inner circumferential end 26b (indicated as "t2" in FIG. 4). The height of the inner circumferential end 26b and the outer circumferential end 26a is preferably measured from a base portion 26c of the channel 23. That is, the base portion 26c is the lowest or deepest point of the channel 23 from the top surface 26d of the channel 23. Thus, the eddy flow is generated in the region formed by the grooves 23 of the rotor and the grooves 11a formed between the rotor 20 and the center housing 11C (and the rear housing 11R.)

According to the representative pump 10, the driving force of the engine E is transmitted to the drive shaft 22 and the drive shaft 22 rotates together with the rotor 20. By rotating the rotor 20, the blades 21 of the rotating rotor 20 generate a pumping force and the coolant is drawn from the suction port 13 into the actuation chamber 25. Then, the fluid is pressurized by the rotating rotor 20 and released or discharged from the discharge port 14 to the throttle valve 40 (see FIG. 1). When the rotor 20 rotates within the actuation chamber 25, the rotating blades 21 generate a flow of the coolant in the rotational direction of the rotor 20. This flow defines a "main flow" of the fluid. Further, as indicated by the arrows in FIGS. 3 and 4, the coolant within the concave-shaped channel 23 and the groove 11a tend to move from the inner circumferential end 26b to the outer circumferential end 26a. Thus, a secondary or eddy flow of the coolant is generated substantially in the radial direction of the rotor 20. Due to the main and secondary flows, the pressure of the coolant within the actuation chamber 25 increases and the high-pressure coolant within the actuation chamber 25 is released from the discharge port 14. Because the pump 10 can also push the coolant through the coolant circulation system, the pump 10 can serve as an auxiliary pump to assist the water pump 52 (see FIG. 1).

When the pump 10 operates, high-pressure coolant near the discharge port 14 tends to leak through a clearance between the dividing wall 15 and the channels 23 towards the suction port 13. When the high-pressure coolant enters and passes through the clearance, the internal energy of the coolant is converted to heat and this heat increases the temperature of the coolant. That is, the pump 10 heats the fluid and therefore, the representative pump 10 can serve as a fluid-heat pump.

Consequently, the pump 10 can perform a fluid transport function and a fluid heating function. That is, driving force of the vehicle engine E is converted to heat in order to increase the temperature of the coolant within the pump 10. Further, the coolant is supplied under pressure from the pump 10 to the throttle valve 40. When the pressurized coolant reaches the throttle valve 40, the throttle valve 40 exerts a braking or throttling force on the pressurized coolant. As a result, the internal energy of the coolant will be converted into heat and the coolant temperature will increase.

Figure 5:
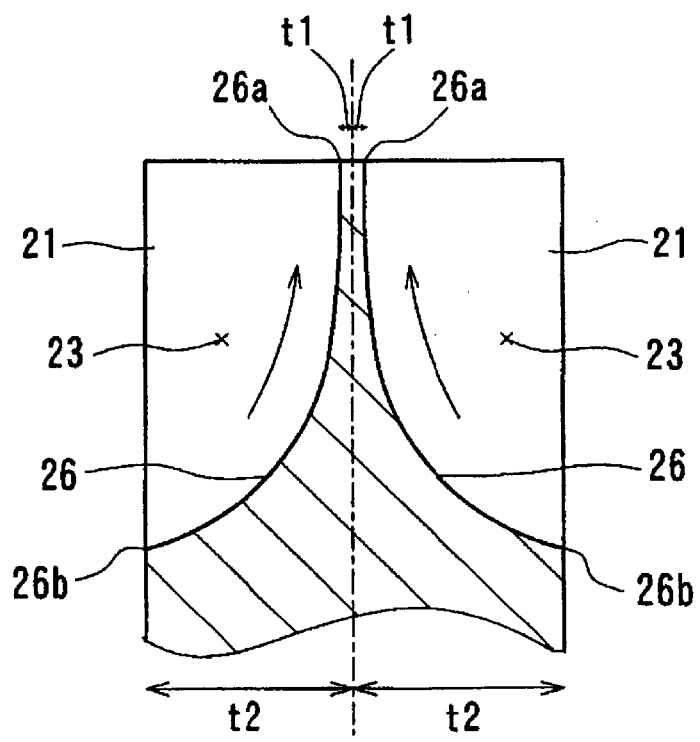
FIG. 5 shows a partial cross-sectional view of a second representative rotor.

A second representative embodiment of the present teachings is shown in FIG. 5, which shows a channel 23 of the rotor 20 having a different construction from the first representative embodiment. The surface 26 of the channel 23 extends from the outer circumferential end 26a to the inner circumferential end 26b and the surface 26 has a substantially curved surface. As in the first representative embodiment, the height (length) of the outer circumferential end 26a (t1) is less than the height (length) of the inner circumferential end 26b (t2). The outer circumferential end 26a is the lowest or deepest point of the channel 23. However, in the second representative embodiment, the outer circumference of the channels 23 does not substantially shield the channel 23. By modifying the channel height t1 at the outer circumferential end 26a, the amount of the internal energy generated in the coolant due to the secondary flow of the coolant within the channel 23 can be changed. Thus, the total amount of the internal energy of the fluid can be changed.

Figure 6:
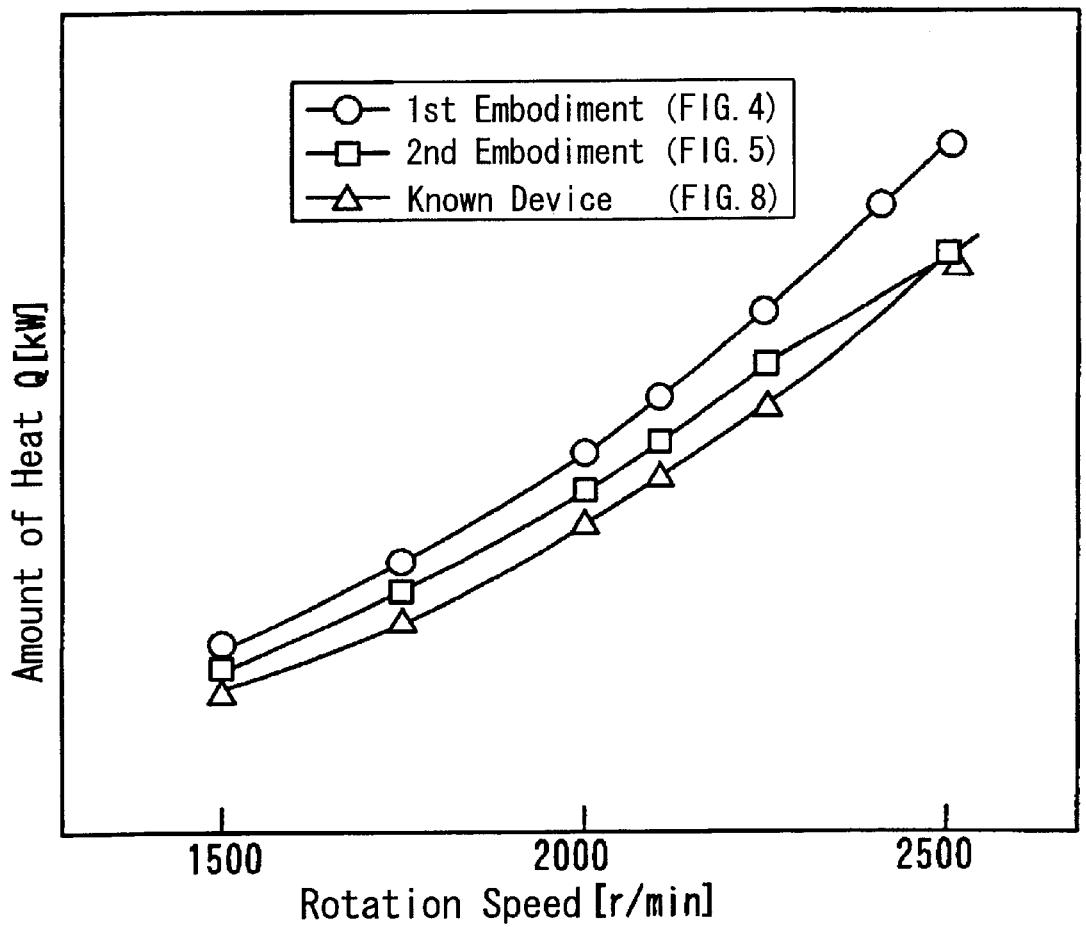
FIG. 6 shows a correlation between the amount of heat generated in the coolant and the rotational speed of the two representative rotors compared to the known rotor.
Figure 7:
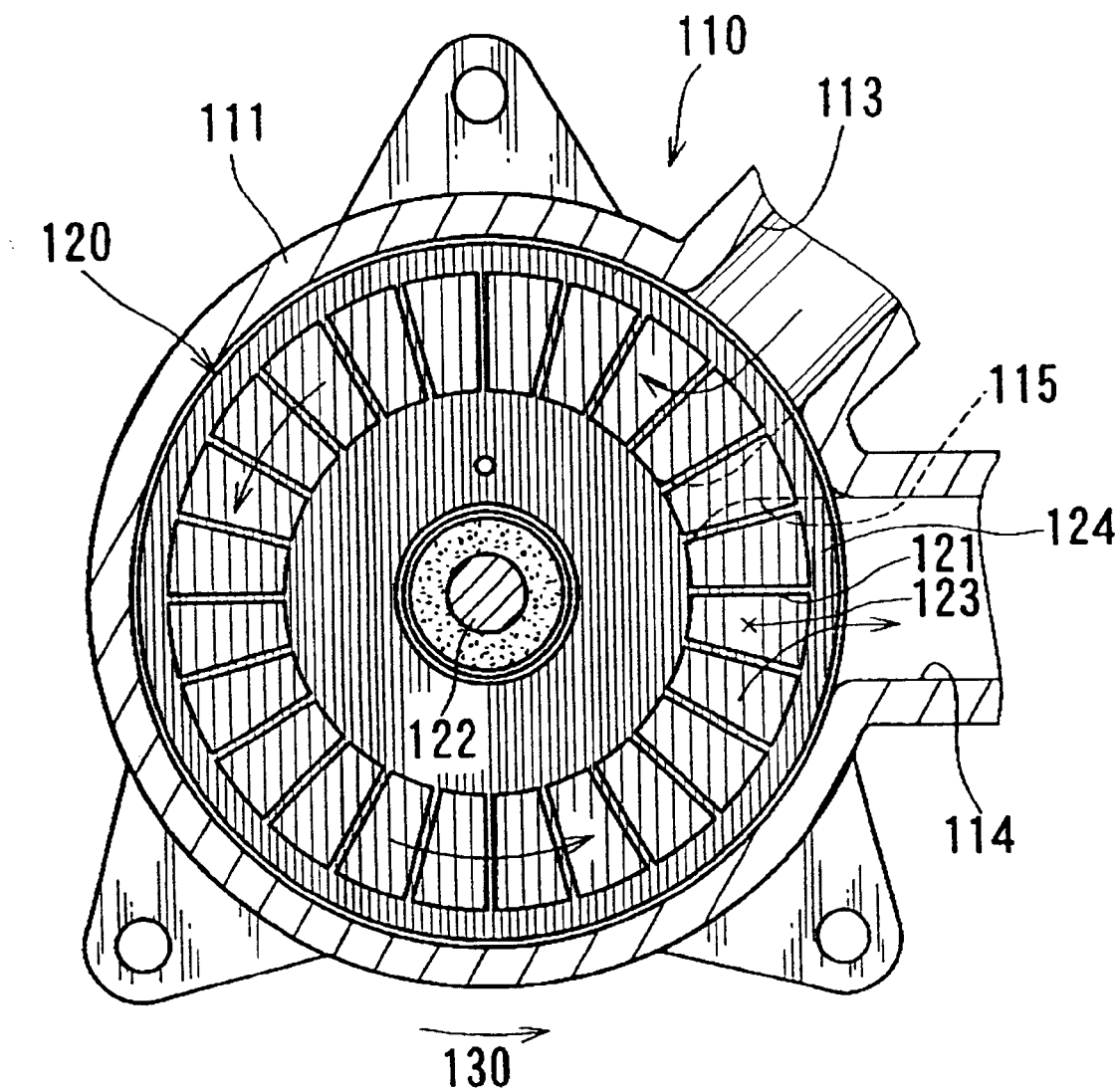
FIG. 7 shows a cross-sectional view of a known pump.
Figure 8:
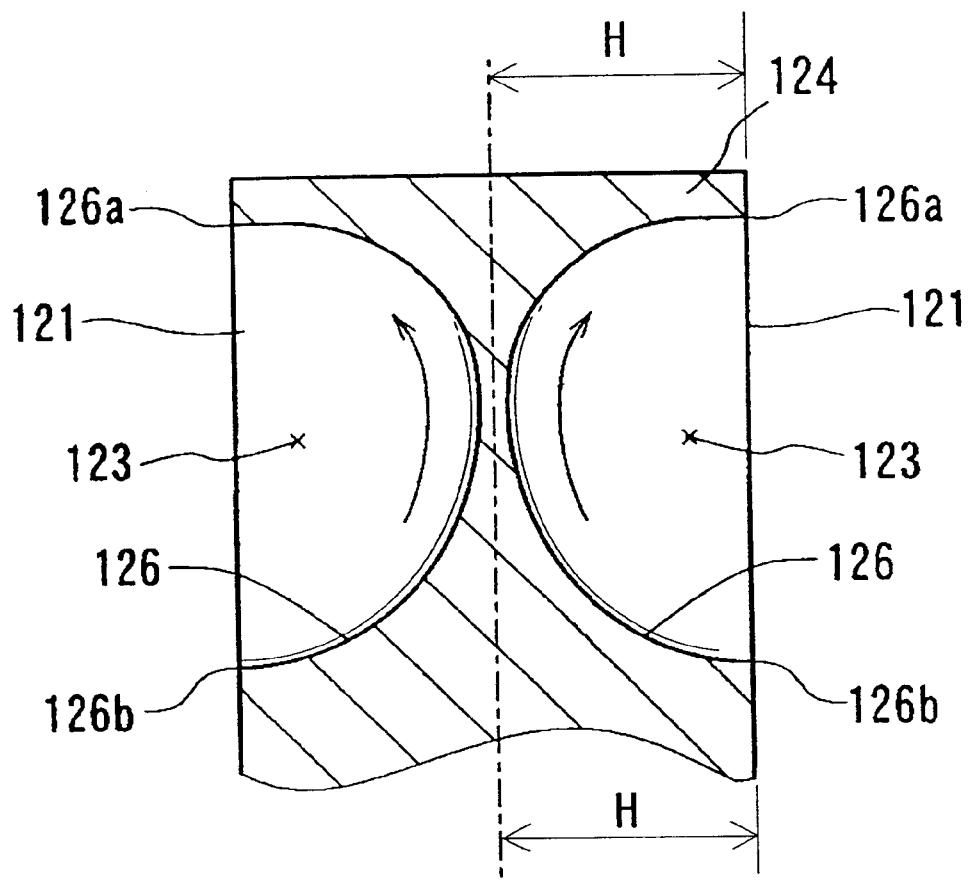
FIG. 8 shows a partial cross-sectional view of the known rotor shown in FIG. 7.

The heat generating efficiency of the first and second representative rotors was measured and compared to the known rotor of U.S. Pat. No. 3,720,372. As shown in FIG. 6, the correlation between the rotation speed of the rotor 20 and the amount of generated heat to increase the coolant temperature varies according to the shape of the channel surface 26. Measurements of the amount of heat generation Q in the coolant were taken at several different rotational speeds of the rotor 20. The line that connects the symbol "α1" represent data measured using the rotor shown in FIG. 4 (i.e. the first representative embodiment). The line that connect the symbol "□" represent data measured using the rotor shown in FIG. 5 (i.e. the second representative embodiment). The line that connects the symbol "Δ" represent data measured using the rotor shown in FIG. 8 (i.e. the known device).

As shown in FIG. 6, the total amount of heat generation Q in the coolant generally increases in accordance with the increase of the rotation speed of the rotor 20. However, the rotor shown in FIG. 4 provided the highest heat-generation efficiency, although the rotor shown in FIG. 5 also provided higher heat-generation efficiency than the known rotor shown in FIG. 8. The eddy flow flows smoothly with the rotors in FIGS. 4 and 5, whose outer circumferential ends are not shielded, compared to the rotor completely shielded at its outer circumferential end in FIG. 8.

In the above-mentioned representative embodiments, the channel 23 includes a curved surface 26. However, other shapes can be utilized for the channel surface 26. For example, the channel surface 26 can be defined by combining multiple planes. Further, in the above-mentioned representative embodiments, the blades 21 are disposed on both sides of rotor body 24. However, blades 21 can be disposed on only one side of rotor body 24.

Further, although each channel surface 26 of the representative embodiments has the same shape, the channel surfaces 26 of a rotor 20 may include a plurality of different shapes. Further, the channel surfaces 26 on one side of the rotor body 24 can have the same shape and the channel surfaces 26 on the other side of the rotor body 24 can have a different shape.

Preferably, each blade may be made of steel and may be inserted to the rotor body. Each blade may preferably have a thickness of 1.2 mm or less than 1.2 mm. Relatively thin blade can increase the space defined by the mutually neighboring blades and thus, contributing the effective heat generation, while the steel blade can increase the strength of the blade.

With respect to the structure of the actuation chamber, a fluid introducing passage may preferably connect the high-pressure area (discharge area) to the low-pressure area (suction area). Preferably, the fluid introducing passage may be formed within the dividing wall. Further, a fluid release valve that opens and closes the fluid introducing passage may be adapted in order to release the high-pressure fluid to the low-pressure area. By releasing the high-pressure fluid to the low-pressure area, excessive heat generation can be alleviated. For example, a rotary valve, a ball valve or a lead valve can be utilized for the release valve. Further, a pilot valve for opening the release valve may be installed. The pilot valve may open the release valve with relatively small amount of the fluid and thus, the alleviation control of the heat generation can quickly and precisely be performed. Preferably, the pilot valve may include a spool that can actuate the release valve.

Further, each groove of the pump housing may include a plurality of shield blades at the inner circumferential side that corresponds to the rotor body (inner circumferential side just close to the drive shaft). The height of the shield blade measured from the inner circumferential surface of the groove in the direction of the outer circumferential surface of the groove may be approximately ⅛ (one eighth) of the height of the actuation chamber measured from the inner circumferential surface of the groove to the outer circumferential surface of the groove. By such structure, heat generating effect can be effectively controlled.

The thickness of the dividing wall in the rotational direction of the rotor can be selected from the various dimensions in relation to the width of the space defined by the mutually neighboring blades with respect to the rotational direction of the rotor. On the other hand, in order to secure the heat generating efficiency and to reduce the noise in operating the fluid heating device, the thickness of the dividing wall in the rotational direction of the rotor may preferably be equal to or wider than the width of the space defined by the mutually neighboring blades with respect to the rotational direction of the rotor. Further, the dividing wall may have groove. Preferably, multiple grooves may be provided on the surface of the dividing wall that faces the rotor blade.

Further techniques for making and using fluid heating devices are taught in a U.S. patent application Ser. No. 09/576,355 and U.S. Patent Publication Numbers 2000-0011524 and 2002-0005181, all of which are commonly assigned and are incorporated by reference as if fully set forth herein.

What is claimed is:

1. A fluid heating apparatus adapted to heat a fluid, comprising:
    a rotor housing having a discharge port;
    a rotor body rotatably supported within the rotor housing, wherein a plurality of blades are disposed on a circumferential surface of the rotor body and a channel is defined between each two adjacent blades, each channel having a base portion, an inner circumferential end and an outer circumferential end, wherein the inner circumferential end is longer than the outer circumferential end as measured from the base portion; and
    a throttle in communication with the discharge port, the throttle arranged and constructed to convert internal energy of pressurized fluid discharged via the discharge port into heat, thereby increasing the temperature of the fluid.

2. A fluid heating apparatus according to claim 1, wherein the outer circumferential ends of the channels define wall portions and the wall portions are shorter than the inner circumferential ends as measured from the base portions of the channels.

3. A fluid heating apparatus according to claim 1, wherein substantially no shields are provided toward the outer circumferential ends of the channels.

4. A fluid heating apparatus according to claim 1, wherein the base portion defines the lowest point of the surface between the outer circumferential end and the inner circumferential end.

5. A fluid heating apparatus according to claim 1, wherein a substantially curved surface is defined between the outer circumferential end and the inner circumferential end.

6. A fluid heating apparatus according to claim 1, wherein blades are disposed on opposing sides of the rotor body.

7. A fluid heating apparatus according to claim 1, wherein the blades radially extend from a rotational center of the rotor body towards an outer circumference of the rotor body.

8. A fluid heating apparatus as in claim 1, wherein the rotor housing defines an actuation chamber arranged and constructed to pressurize fluid drawn into the rotor housing by rotating the rotor body.

9. A fluid heating apparatus according to claim 8, wherein the rotor housing further comprises:
    a suction port arranged and constructed to draw fluid into the actuation chamber; and
    a dividing wall disposed along an inner wall of the rotor housing in order to separate the discharge port from the suction port, the discharge port being in communication with pressurized fluid disposed within the actuation chamber.

10. (Amended) A fluid heating apparatus according to claim 9, wherein a clearance is defined between the dividing wall and the blades of the rotor, whereby pressurized fluid near the discharge port leaks through the clearance towards the suction port.

11. A fluid heating apparatus according to claim 10, wherein the outer circumferential ends of the channels define wall portions and the wall portions are shorter than the inner circumferential ends as measured from the base portions of the channels, substantially no shields are provided toward the outer circumferential ends of the channels, a substantially curved surface is defined between the outer circumferential end and the inner circumferential end, blades are disposed on opposing sides of the rotor body and the blades radially extend from a rotational center of the body towards an outer circumference of the rotor body.

12. A method for heating a fluid, comprising:
    pressurizing fluid drawn into the rotor housing of claim 11;
    discharging pressurized fluid via the discharge port to the throttle of claim 12; and
    throttling the pressurized fluid, whereby internal energy of the pressurized fluid is converted into heat.

13. A method for heating a fluid, comprising:
    pressurizing fluid drawn into the rotor housing of claim 1;
    discharging pressurized fluid via the discharge port to the throttle of claim 1; and
    throttling the pressurized fluid, whereby internal energy of the pressurized fluid is converted into heat.

14. An apparatus, comprising:
    a pump comprising a rotor housing having a suction port, a discharge port and an actuation chamber defined between the suction port and the discharge port, wherein a rotor is rotatably supported within the actuation chamber, a plurality of blades are defined on at least one circumferential surface of the rotor and a channel is defined between each two adjacent blades, each channel having a base portion, an inner circumferential end and an outer circumferential end, wherein the inner circumferential end is longer than the outer circumferential end as measured from the base portion; and
    a throttle comprising a throttle valve in communication with the discharge port, the throttle valve being arranged and constructed to brake pressurized fluid discharged via the discharge port and thereby increase the temperature of the fluid.

15. An apparatus as in claim 14, wherein the outer circumferential ends of the channels define wall portions and the wall portions are shorter than the inner circumferential ends as measured from the base portions of the channels, substantially no shields are provided toward the outer circumferential ends of the channels, a substantially curved surface is defined between the outer circumferential end and the inner circumferential end, blades are disposed on at least two sides of the rotor and the blades radially extend from a rotational center of the rotor towards an outer circumference of the rotor.

16. An apparatus as in claim 14, wherein the pump further comprises a dividing wall disposed along an inner wall of the rotor housing and separating the discharge port from the suction port.

17. An apparatus as in claim 16, wherein a clearance is defined between the dividing wall and the blades of the rotor, the clearance being arranged and constructed such that pressurized fluid proximal to the discharge port will leak via the clearance towards the suction port.

18. An apparatus as in claim 16, further comprising:

an engine comprising a water jacket, the suction port of the pump being in communication with the water jacket; and a heater core in communication with a discharge port of the throttle.

19. An apparatus as in claim 18, further comprising a radiator in communication with the discharge port of the throttle.

20. A method for heating a fluid, comprising:

pressurizing fluid within the activation chamber of claim 14;

discharging pressurized fluid via the discharge port of the pump to the throttle of claim 15; and throttling the pressurized fluid, whereby the fluid temperature increases.

* * * * *

UNITED STATES PATENT AND TRADEMARK OFFICE
CERTIFICATE OF CORRECTION

PATENT NO.    : 6,558,112 B2
DATED         : May 6, 2003
INVENTOR(S)   : Takahiro Moroi et al.

It is certified that error appears in the above-identified patent and that said Letters Patent is hereby corrected as shown below:

<u>Column 6,</u>
Line 9, please delete "$\alpha\mathbf{1}$" and insert therefore -- O --

Signed and Sealed this

Ninth Day of September, 2003

JAMES E. ROGAN
*Director of the United States Patent and Trademark Office*